United States Patent
Fan et al.

(10) Patent No.: US 12,359,269 B1
(45) Date of Patent: Jul. 15, 2025

(54) ELECTRICAL STEEL WITH LOW IRON LOSS AND METHOD FOR CONTROLLING TENSION THEREOF DURING DECARBURIZATION ANNEALING

(71) Applicant: Inner Mongolia University of Technology, Hohhot (CN)

(72) Inventors: Lifeng Fan, Hohhot (CN); Yujie Fu, Hohhot (CN); Erbin Yue, Hohhot (CN); Lijun Xiao, Hohhot (CN); Jiao Huang, Hohhot (CN); Yanyun Bai, Hohhot (CN); Li Sun, Hohhot (CN); Feng Guo, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 0 days.

(21) Appl. No.: 18/901,033

(22) Filed: Sep. 30, 2024

(30) Foreign Application Priority Data

Jun. 6, 2024 (CN) .......................... 202410730271.6

(51) Int. Cl.
*C21D 3/04* (2006.01)
*C21D 1/30* (2006.01)
*C21D 6/00* (2006.01)
*C21D 11/00* (2006.01)

(52) U.S. Cl.
CPC ................ *C21D 3/04* (2013.01); *C21D 1/30* (2013.01); *C21D 11/00* (2013.01); *C21D 6/008* (2013.01)

(58) Field of Classification Search
CPC . C21D 3/04; C21D 1/30; C21D 11/00; C21D 6/008
USPC ........................................................ 148/629
See application file for complete search history.

(56) References Cited

U.S. PATENT DOCUMENTS

| | | | | |
|---|---|---|---|---|
| 4,375,283 A | * | 3/1983 | Shimoyama | C21D 9/56 266/78 |
| 5,192,585 A | * | 3/1993 | Inokuti | C21D 9/565 427/295 |
| 6,193,819 B1 | * | 2/2001 | Kim | C21D 8/0268 148/629 |
| 9,617,615 B2 | * | 4/2017 | Senda | C21D 9/46 |
| 2015/0099141 A1 | | 4/2015 | Wu et al. | |

FOREIGN PATENT DOCUMENTS

| | | |
|---|---|---|
| CN | 111868273 A | 9/2019 |
| CN | 117737375 A | 3/2024 |
| JP | 1987069503 A | 3/1987 |

OTHER PUBLICATIONS

Normal Force and Tension [Introduction to Physics (Park), Chapter 2.6, p. 91-96] (Year: 2024).*
Fuan Hua et.al. ["Research and development of a pilot continuous annealing and MgO coating line for grain-oriented silicon steel", Ironmaking & Steelmaking, 2022, vol. 49, No. 8, 741-748] (Year: 2022).*
Notice of Allowance for CN 202410716560.0 from CNIPA and Allowed Claims.

* cited by examiner

*Primary Examiner* — Sally A Merkling
*Assistant Examiner* — Nazmun Nahar Shams

(57) ABSTRACT

The present disclosure relates to the technical field of iron and steel, in particular to an electrical steel with low iron loss and method for controlling tension thereof during decarburization annealing. A tension of each procedure of decarburization annealing of the electrical steel is controlled and adjusted respectively, and further combined with temperature of the decarburization annealing furnace, treatment time of the electrical steel in decarburization annealing furnace, and width and thickness of the electrical steel to prevent deflecting, cracking and narrowing of the electrical steel in the furnace and nodules on the bottom of roller. Compared with products of same brand, surface roughness and magnetic hysteresis loss of product are decreased by 10-20% and 10-15%.

1 Claim, No Drawings

ELECTRICAL STEEL WITH LOW IRON LOSS AND METHOD FOR CONTROLLING TENSION THEREOF DURING DECARBURIZATION ANNEALING

CROSS-REFERENCE TO RELATED APPLICATIONS

This application claims priority to Chinese Patent Application No. 202410730271.6 with a filing date of Jun. 6, 2024. The content of the aforementioned application, including any intervening amendments thereto, is incorporated herein by reference.

TECHNICAL FIELD OF THE INVENTION

The present disclosure relates to a technical field of iron and steel material, in particular to an electrical steel with low iron loss and method for controlling tension thereof during decarburization annealing.

BACKGROUND OF THE INVENTION

Requirement on surface quality of electrical steel is extremely high; iron loss and lamination factor are influenced by roughness and flatness of electrical steel. Thus, tension controlling during heat treatment is an important technical guarantee to maintain plate shape and prevent deflecting, cracking and narrowing of electrical steel in the furnace and nodules on the bottom of roller. However, the tension control of electrical steel during decarburization annealing in the prior art is not enough, which leads to the property loss of electrical steel.

SUMMARY OF THE INVENTION

In order to solve the problems of the above-mentioned prior art, the main object of the present disclosure is to provide an electrical steel with low iron loss and method for controlling tension thereof during decarburization annealing.

In order to achieve the above object, according to one aspect of the present disclosure, the following technical solution is provided.

A method for controlling tension of electrical steel during decarburization annealing, wherein the decarburization annealing includes the following procedures in turn: uncoiler, entrance tension roller, degreasing and dry-cleaning section, entrance looper, decarburization annealing furnace, exit looper, exit tension roller, and recoiler. Setting a tension of entrance tension roller to 2000-2500 kg-f, a tension of entrance looper to 350-550 kg-f, a tension of decarburization annealing furnace to 120-150 kg-f, a tension of exit looper to 200-300 kg-f, and a tension of exit tension roller to 1500-1800 kg-f.

As a preferred embodiment of the method for controlling tension of electrical steel during decarburization annealing according to the present disclosure, temperature of the decarburization annealing furnace is 800-1050° C.

As a preferred embodiment of the method for controlling tension of electrical steel during decarburization annealing according to the present disclosure, treatment time of the electrical steel in the decarburization annealing furnace is 3-5 min.

As a preferred embodiment of the method for controlling tension of electrical steel during decarburization annealing according to the present disclosure, thickness of the electrical steel is 0.1-0.65 mm. Width of the electrical steel is 500-1800 mm.

In order to achieve the above object, according to another aspect of the present disclosure, the following technical solutions are provided.

An electrical steel with low iron loss, produced by the method mentioned above.

As a preferred embodiment of the electrical steel with low iron loss according to the present disclosure, wherein the electrical steel with low iron loss includes, by mass percentage, C≤0.1 wt %, Si≤4.0 wt %, Mn 0.05-1.0 wt %, S≤0.012 wt %, Al≤1.0 wt %, N≤0.012 wt %, Sn or Sb 0.03-0.08 wt %, RE 0.002-0.01 wt %, a balance being Fe and unavoidable impurities that are present in trace amounts.

As a preferred embodiment of the electrical steel with low iron loss according to the present disclosure, surface roughness and magnetic hysteresis loss are decreased by 10-20% and 10-15%, compared with products of same grade.

The advantages of the present disclosure are as follows.

The present disclosure provides a method for controlling tension of electrical steel during decarburization annealing. The tension of each procedure of decarburization annealing of the electrical steel is controlled and adjusted respectively, and further combined with the temperature of the decarburization annealing furnace, the treatment time of the electrical steel in decarburization annealing furnace, and the width and thickness of the electrical steel to prevent deflecting, cracking and narrowing of the electrical steel in the furnace and nodules on the bottom of the roller. Compared with the products of same grade, the surface roughness and the magnetic hysteresis loss are decreased by 10-20% and 10-15%.

DETAILED DESCRIPTION OF THE INVENTION

A clear and complete description will be made below in conjunction with the technical solutions in the embodiments. Apparently, the described embodiments are only some of the embodiments of the present disclosure, but not all of them. Based on the embodiments of the present disclosure, all other embodiments obtained by persons of ordinary skill in the art without inventive efforts fall within the protection scope of the present disclosure.

The advantages of the method for controlling tension of electrical steel during decarburization annealing according to the present disclosure are as follows.

1. the present disclosure establishes a relationship between annealing temperature, treatment time of electrical steel in the furnace and tension. The tension must be coordinated with the temperature and the treatment time. In order to ensure decarburization effect, the treatment time of the electrical steel in the furnace should be decreased and the tension should be increased when the temperature increases. The treatment time of the electrical steel in the furnace should be increased and the tension should be decreased when the temperature decreases.
2. the present disclosure adopts a method of controlling tensions by stages of processing. A large tension is applied on an initial cold rolled electrical steel at low temperature before decarburization annealing to ensure that the steel strip is straight. A small tension is applied on an electrical steel in the decarburization furnace to prevent cracking and narrowing of the electrical steel.

And a medium tension is applied on a regenerated electrical steel under each procedure after decarburization annealing.
3. when the electrical steel in the present disclosure is narrow, a small tension is applied. The tension should be increased properly when the electrical steel is wide. When the electrical steel in the present disclosure is thin, a small tension is applied. The tension should be increased properly when the electrical steel is thick.
4. when the thickness and width of the electrical steel, the temperature and the time in the furnace in the present disclosure match with each other, the effect of the decarburization annealing can be guaranteed by adjusting the tension according to the principle mentioned above.
5. the present disclosure ensures the quality and quantity, solves the problems of deflecting, cracking and narrowing of the electrical steel and nodules on the bottom of roller, and also improves the production efficiency.
6. the surface quality of the electrical steel in the present disclosure is good. Compared with the products of same grade, the surface roughness and magnetic hysteresis loss of the electrical steel in the present disclosure are decreased by 10-20% and 10-15% respectively.

According to one aspect of the present disclosure, the present disclosure provides following technical solutions.

A method for controlling tension of electrical steel during decarburization annealing is provided. The decarburization annealing includes the following procedures in turn: uncoiler, entrance tension roller, degreasing and dry-cleaning section, entrance looper, decarburization annealing furnace, exit looper, exit tension roller and recoiler. Setting a tension of entrance tension roller to 2000-2500 kg-f, a tension of entrance looper to 350-550 kg-f, a tension of decarburization annealing furnace to 120-150 kg-f, a tension of exit looper to 200-300 kg-f, and a tension of exit tension roller to 1500-1800 kg-f.

Preferably, temperature of the decarburization annealing furnace is 800-1050° C.

Preferably, treatment time of the electrical steel in the decarburization annealing furnace is 3-5.5 min.

Preferably, thickness of the electrical steel is 0.1-0.65 mm. Width of the electrical steel is 500-1800 mm.

In order to achieve the above object, according to another aspect of the present disclosure, the following technical solution is provided.

An electrical steel with low iron loss, produced by the method mentioned above.

Preferably, the electrical steel with low iron loss includes, by mass percentage, C≤0.1 wt %, Si≤4.0 wt %, Mn 0.05-1.0 wt %, S≤0.012 wt %, Al≤1.0 wt %, N≤0.012 wt %, Sn or Sb 0.03-0.08 wt %, RE 0.002-0.01 wt %, a balance being Fe and other unavoidable impurities that are present in trace amounts.

Preferably, surface roughness and magnetic hysteresis loss are decreased by 10-20% and 10-15%, compared with products of same grade.

The technical solutions of the present disclosure will be further described below in conjunction with specific examples.

The electrical steel of each example and comparative example, by mass percentage, includes 0.65% C, 3.8% Si, 0.76% Mn, 0.008% S, 0.6% Al, 0.011% N, 0.07% Sn or Sb, 0.008% La, a balance being Fe and other unavoidable impurities that are present in trace amounts.

Example 1

A method for controlling tension of electrical steel during decarburization annealing, wherein the decarburization annealing includes the following procedures in turn: uncoiler, entrance tension roller, degreasing and dry-cleaning section, entrance looper, decarburization annealing furnace, exit looper, exit tension roller and recoiler. A tension of entrance tension roller was set to 2000 kg-f A tension of entrance looper was set to 350 kg-f A tension of decarburization annealing furnace was set to 120 kg-f A tension of exit looper was set to 200 kg-f A tension of exit tension roller was set to 1500 kg-f Temperature of the decarburization annealing furnace was 800° C. Treatment time of the electrical steel in the decarburization annealing furnace was 5.5 min. Thickness of the electrical steel was 0.1 mm. Width of the electrical steel was 500 mm.

Surface quality of the electrical steel in this example was good. Compared with products of same grade, surface roughness and magnetic hysteresis loss of the electrical steel in this example were decreased by 10% and 10%, respectively.

Example 2

A method for controlling tension of electrical steel during decarburization annealing, wherein the decarburization annealing includes the following procedures in turn: uncoiler, entrance tension roller, degreasing and dry-cleaning section, entrance looper, decarburization annealing furnace, exit looper, exit tension roller and recoiler. A tension of entrance tension roller was set to 2500 kg-f A tension of entrance looper was set to 550 kg-f A tension of decarburization annealing furnace was set to 150 kg-f A tension of exit looper was set to 300 kg-f. A tension of exit tension roller was set to 1800 kg-f Temperature of the decarburization annealing furnace was 1050° C. Treatment time of the electrical steel in the decarburization annealing furnace was 3.3 min. Thickness of the electrical steel was 0.65 mm. Width of the electrical steel was 1800 mm.

Surface quality of the electrical steel in this example was good. Compared with the products of same grade, surface roughness and magnetic hysteresis loss of the electrical steel in this example were decreased by 20% and 15% respectively.

Comparative Example 1

A method for controlling tension of electrical steel during decarburization annealing, wherein the decarburization annealing includes the following procedures in turn: uncoiler, entrance tension roller, degreasing and dry-cleaning section, entrance looper, decarburization annealing furnace, exit looper, exit tension roller and recoiler. A tension of entrance tension roller was set to 2300 kg-f A tension of entrance looper was set to 600 kg-f A tension of decarburization annealing furnace was set to 200 kg-f A tension of exit looper was set to 350 kg-f A tension of exit tension roller was set to 2000 kg-f Temperature of the decarburization annealing furnace was 1000° C. Treatment time of the electrical steel in the decarburization annealing furnace was 3.3 min. Thickness of the electrical steel was 0.55 mm. Width of the electrical steel was 1500 mm.

Defect of narrowing of the electrical steel in the furnace was generated. Compared with products of same grade, surface roughness and magnetic hysteresis loss of the electrical steel in this comparative example were increased by 5% and 10% respectively, due to that the thickness and the width of the electrical steel, the temperature and the time in the furnace didn't match with each other, which leaded to an increase of inner stress of the electrical steel and deterioration of surface quality and loss.

It can be seen from the above-mentioned examples and comparative example that the tension of each procedure of decarburization annealing of the electrical steel is controlled and adjusted respectively, and further combined with the temperature of the decarburization annealing furnace, the treatment time of the electrical steel in decarburization annealing furnace, and the width and thickness of the electrical steel to prevent deflecting, cracking and narrowing of electrical steel in the furnace and nodules on the bottom of roller. Compared with the products of same grade, the surface roughness and the magnetic hysteresis loss are decreased by 10-20% and 10-15%.

The above description is only a preferred embodiment of the present disclosure and does not limit the patent scope of the present disclosure. Under the inventive concept of the present disclosure, the equivalent structural transformation made by using the content of the description of the present disclosure, or directly/indirectly used in other related all technical fields are comprised in the patent protection scope of the present disclosure.

What is claimed is:

1. A method for controlling tension of electrical steel during decarburization annealing, characterized in that electrical steel with low iron loss comprises, by mass percentage, C≤0.1 wt %, Si≤4.0 wt %, Mn 0.05-1.0 wt %, S≤0.012 wt %, Al≤1.0 wt %, N≤0.012 wt %, Sn or Sb 0.03-0.08 wt %, RE 0.002-0.01 wt %, a balance being Fe and unavoidable impurities that are present in trace amounts;

the decarburization annealing comprises the following procedures in turn: uncoiler, entrance tension roller, degreasing and dry-cleaning section, entrance looper, decarburization annealing furnace, exit looper, exit tension roller, and recoiler; setting a tension of entrance tension roller to 2000-2500 kg-f, a tension of entrance looper to 350-550 kgf, a tension of decarburization annealing furnace to 120-150 kg-f, a tension of exit looper to 200-300 kg-f, and a tension of exit tension roller to 1500-1800 kgf;

temperature of the decarburization annealing furnace is 800-1050° C.;

treatment time of the electrical steel in the decarburization annealing furnace is 3-5 min;

thickness of the electrical steel is 0.1-0.65 mm; width of the electrical steel is 500-1800 mm;

surface roughness and magnetic hysteresis loss are decreased by 10-20% and 10-15%, compared with products of same grade.

* * * * *